Sept. 3, 1957  W. E. VOSS  2,805,040
CONTROL VALVE DEVICES
Filed March 10, 1955
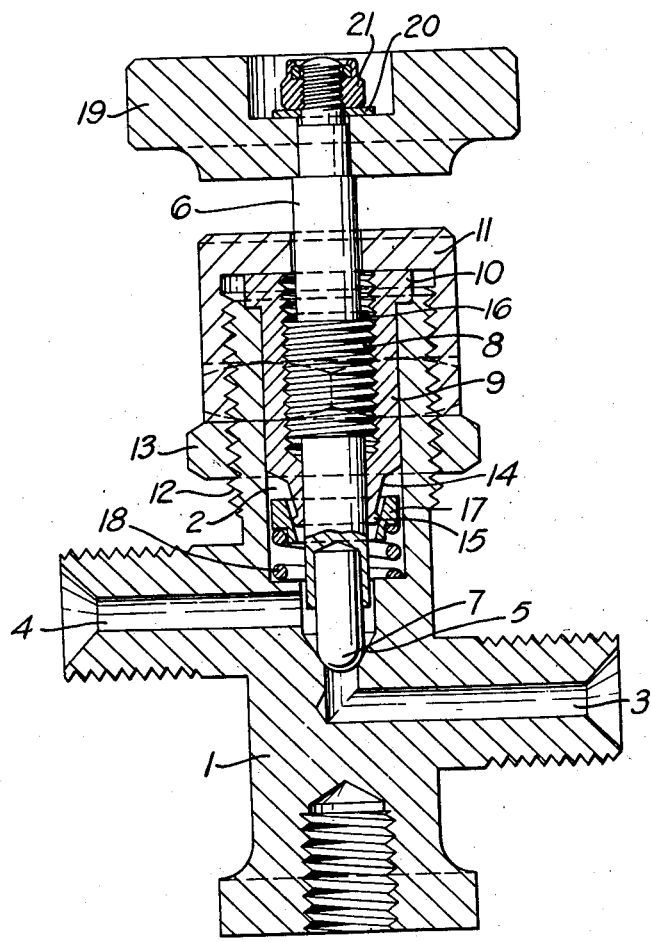
Inventor:
Waldemar Emil Voss
By his attorneys:
Baldwin + Wight

United States Patent Office 2,805,040
Patented Sept. 3, 1957

2,805,040

CONTROL VALVE DEVICES

Waldemar Emil Voss, Kenton, England, assignor to L. Adams Limited, London, England, a British Company Application March 10, 1955, Serial No. 493,403

Claims priority, application Great Britain April 9, 1954

8 Claims. (Cl. 251—214)

This invention relates to control valve devices for use in pressure fluid systems, more especially for use in conjunction with compressed gaseous oxygen supply systems, such as are used in respiration aids in aviation, mountaineering and surgery, and has for an object the provision of valve devices having improved ease of operation, reduction in weight, elimination of added lubricant, extended life and increased resistance to wear and improved sealing both in the fully open and closed positions and in all intermediate positions, in particular when both the inlet and outlet connections of the valve device are connected to a system at a pressure greater than atmospheric pressure.

According to the persent invention, a valve device includes a valve body, bored to provide an inlet and an outlet port, a valve element having an operating spindle and a hemispherical nose adapted to seat on a conical seat in said bore to seal the outlet port, a tapered gland member, such as a bushing, accommodating or receiving said spindle for co-operation with a second conical seating surface formed in a thrust member, such as a block in the valve body, to provide a leak-proof joint between the valve spindle and valve body.

The tapered gland member or bushing is preferably bored and formed internally with a female thread to engage a male thread on the valve spindle, the tapering of the gland bushing providing diminishing thickness, so as to form a resilient gland seal concentric with and surrounding the spindle.

The gland bushing is preferably continuously maintained in close contact with the spindle by spring loading the thrust block, which is formed with a tapered bore, so as to be located in line contact around the tapering gland bushing and to compress said bushing inwardly to grip the valve spindle under pressure exerted by the spring through the thrust block. To assist in this, the lower end of the gland bushing terminates in a rounded flange.

Preferably the gland bushing is formed as a freely fitting sleeve insert in the valve body, and is locked against rotation and sealed to said body, adjacent the top thereof, through an integral flange compressed onto a seating surface in the valve body, by means of a clamping nut screwing onto the valve body and concentric with the valve spindle.

Preferably the valve body is made of a light metal or light metal alloy, for example aluminium or aluminium alloy, whilst the gland member is preferably made from a slightly resilient synthetic material such as nylon, which requires no lubricant for the mating screw thread of the valve spindle and which will maintain a gland seal around the spindle without increasing the operating torque excessively.

The thrust block is preferably made of harder material than the gland, such as aluminium-alloy, and is relatively non-resilient.

In order to minimise wear between the valve seat and valve element nose, one of the two is preferably made of slightly resilient material relative to the other, for example the nose of the valve element may be formed of an unplasticised acrylic resin which may conveniently have a hemispherical contour, while the valve seat may conveniently be formed in the metal valve body with a concave truncated conical contour.

The valve spindle is preferably made of stainless steel to render it resistant to corrosion and wear.

The thrust block is conveniently spring loaded against the rounded flange of the gland bushing surrounding the valve spindle by means of a compression spring fitted in a recess in the valve body and concentric with the valve spindle.

One form of valve device according to this invention for use in controlling flow of compressed gaseous oxygen, is illustrated in vertical section in the accompanying drawing, referring to which there is provided a valve body 1 of aluminium or aluminium alloy, which is bored centrally as at 2, and has two further bores forming passages at right angles to the main bore 2, one of said secondary bores forming an inlet port or passage 3, and the other an outlet port or passage 4. Where the inlet passage 3 communicates with the central bore 2, the body 1 is formed with a conical seat 5, with which the valve element is adapted to co-operate. Said valve element comprises a valve spindle 6 of stainless steel, terminating in a hemspherical nose 7, preferably formed of polished unplasticized acrylic resin, which nose is adapted to co-operate with the conical seating surface, to give a line contact between the nose of the valve element and its seat.

The valve spindle 6 is formed with a male thread 8 for connection with a female thread on a gland bushing 9, preferably formed of nylon. The said bushing 9 is a free fit in the main bore 2 of the valve body and is sealed thereto by a top flange 10 and pressed against a flat seat in the top surface of the valve body by a clamping nut 11, e. g. of a light alloy, which screws onto a thread 12 on the outer diameter of the valve body and secured by a lock nut 13.

The nylon gland bushing 9 is bored out to receive a female thread for engagement by the thread 8 on the valve spindle 6, whilst the lower end of the bushing is tapered as at 14 and terminates in a rounded flange 15, the whole gland bushing element including the tapered portion 14, flange 15, threaded bore and flange 10 forming one component.

The top of the screw thread on the valve spindle 6 is protected by a stainless steel washer 16 which forms a stop for the valve spindle in the fully open position against the lower surface of the clamping nut 11.

A thrust block 17, e. g. of hard aluminium or aluminium alloy, is provided as a free fit within the main bore 2 of the valve body 1 and is formed with an internal tapered bore, such as to provide free location of the thrust block on the rounded flange 15 of the nylon gland bushing 9, with a line contact between said block and flange, thereby giving an equal closing pressure all round the gland bushing onto the valve spindle. At the lower end, the tapered bore of the thrust block is clear of the valve spindle, which passes through it.

The thrust block 17 is at all times maintained in pressure contact with the rounded flange 15 of the nylon gland bushing 9 by a compression spring 18, which presses the thrust block 17 upwards and tends thereby to compress the said flange and tapering wall of the nylon gland bushing inwards to grip the valve spindle.

The upper end of the valve spindle 6 receives an operating knob 19 which is retained in position by a washer 20 locked by a nut 21 on the end of said spindle.

The valve operates in the following manner:

When a supply of oxygen through the valve is desired, the operating knob 19 is rotated in a counterclockwise direction thus drawing the hemispherical spindle nose 7 off its conical seat 5, when compressed oxygen can pass from the inlet port through the inlet passage 3, past the valve spindle nose 7, to the outlet passage and port 4. Reverse rotation of the knob will, of course, re-seat the valve and seal the inlet.

In all positions of the valve spindle from the closed position (as shown) when the spindle nose 7 is screwed into contact with the seat 5, to the fully open position when the washer 16 comes into contact with the lower surface of the clamping nut 11, thereby preventing further counterclockwise rotation of the knob and valve spindle screw thread, leakage past the valve spindle is prevented by the tapered nylon gland bushing which is compressed around the valve spindle by pressure from the compression spring 18 applied through the thrust block 17.

When the spindle nose 7 is screwed home onto its seat 5, the reaction between the male screw thread 8 of the valve spindle 6 and its mating female thread in the nylon gland bushing 9 will normally tend to lift the lower end of the nylon gland bushing upwards from contact with the thrust block 15. This tendency is overcome by the compression spring 18 which makes good the reaction by expanding to maintain the thrust block in contact with the rounded flange 15 of the nylon gland bushing 9. In the fully open position, when the washer 16 abuts the under surface of the clamping nut 11 and the reaction between the valve spindle 6 and nylon gland bushing screw threads is in the opposite direction, the sealing of the valve spindle is assisted by slight additional compression of the spring transmitted by downward movement of the lower end of the nylon gland bushing into the thrust block.

In known valves of the needle type, the valve spindle nose and seat are commonly both of metal, one of which tends to indent as progressively larger forces are employed in attempting to seal by screwing the valve spindle down, with increasing torques, which aggravate deformation either of the seat or spindle nose, resulting in leakage and inability to seal. It will be appreciated that in valves according to this invention, the use of slightly resilient synthetic material such as unplasticized acrylic resin for the spindle nose seating in a coned metal seat permits a seal to be achieved without permanent deformation and wear of either component, and without excessive torque applied to the valve spindle.

It will also be appreciated that, whereas in known needle type valves, in particular in valves employed in compressed gaseous oxygen systems, the valve body is commonly made of brass or bronze, female screw-threaded to accept the male screwed steel valve spindle, so that operation is possible without seizure, since normal lubrication cannot be applied in contact with compressed oxygen owing to the risk of fire or explosion, the use of a nylon gland bushing in valves according to this invention, female screw-threaded to receive the male screw thread of the valve spindle, not only permits easy rotation of the valve spindle without lubricant, but also allows the valve body to be made in aluminium or aluminium alloy with considerable economy in weight, which is a vital consideration in aircraft or portable applications.

Again, in known needle type valves, sealing of the valve spindle is commonly attempted by means of compressed organic material, such as leather, or by asbestos, surrounding the valve spindle and compressed around it by a gland nut at the point where the valve spindle leaves the valve body, that is at the end remote from the valve seat. Not only is this conducive to leakage past the stem, especially when pressure greater than atmospheric pressure exists at both ports of the valve, but also the gland nut requires to be tightened progressively in an attempt to maintain the seal as the gland material becomes compressed and inelastic.

In valves according to this invention, the valve spindle is effectively sealed near the lower end adjacent to the spindle nose and valve seat by means of the tapered and rounded lower end of the gland bushing, thrust block and compression spring combination, and the function of the clamping nut is to clamp the resilient flange of the nylon gland bushing to the top of the valve body and to act as a stop in the fully open position of the valve. The spindle seal thus produced does not increase operating torque on the spindle excessively, in view of the low frictional characteristics between the spindle and nylon, and is also resistant to wear, slight dimensional changes being taken up by the spring loading of the compression spring exerted through the thrust block. Sealing at the lower end of the valve spindle assists freedom from leakage when pressure greater than atmospheric is incident at the outlet port, even when the valve is closed, and also reduces the operating torque in comparison with valves of similar type where the spindle is sealed at the end remote from the seat, by restricting the area of spindle cross section exposed to the upward force of the fluid pressure supply, effectively, to that of the valve spindle tip which is small in comparison with that of the screw-threaded portion; the pressure load on the valve spindle screw threads is therefore minimised. Finally such valves are able to function with the same efficiency at high or low temperatures of, e. g. 60° C. and —40° C., i. e. tropical or arctic temperatures, since it is so formed as to allow automatically for expansion and contraction of the material under this range of temperatures.

What is claimed is:

1. A control valve device comprising a valve body having a main bore therein and inlet and outlet ports in communication with said main bore; a valve element positioned in said main bore and terminating at one end in a hemispherical nose; a male-threaded operating spindle connected to the other end of said valve element and extending through one end of said main bore, the other end of said main bore having a conical seating surface on which the hemispherical nose of said valve element may seat to seal said outlet passage; an internally bored tapered gland member of diminishing thickness positioned in said main bore and receiving said operating spindle, said gland member having threads to engage the threads on said spindle; and an annular thrust member concentrically positioned in said main bore and having a conical seating surface in which the diminished thickness end of said tapered gland member seats to provide a leak-proof joint between said valve spindle and the wall of said main bore.

2. A control valve device as claimed in claim 1 including spring means interposed between said one end of said main bore and said thrust member, and reacting against the latter so as to cause the conical seating surface of said thrust member to grip said diminished thickness end of said gland member and press it against said spindle.

3. A control valve device as claimed in claim 2 in which the gland member is formed at its diminished thickness end with a rounded flange.

4. A control valve device as claimed in claim 1 in which the gland member is formed as a freely fitting sleeve insert in the valve body, and is locked against rotation and sealed to said body, adjacent the top thereof, through an integral flange compressed onto a seating surface on the valve body, by means of a clamping nut screwing onto the valve body and concentric with the valve spindle.

5. A control valve device as claimed in claim 3 in which the gland member is formed as a freely fitting sleeve insert in the valve body, and is locked against rotation and sealed to said body, adjacent the top thereof, through an integral flange compressed onto a seating surface on the valve body, by means of a clamping nut screwing onto the valve body and concentric with the valve spindle.

6. A control valve device as claimed in claim 1 in which the valve body is made of a light metal whilst the gland member is made from a slightly resilient synthetic material, such for example as nylon.

7. A control valve device as claimed in claim 6 in which the thrust member is made of harder material than the gland member and is relatively non-resilient.

8. A control valve device as claimed in claim 7 in which the nose of the valve element is formed of an unplasticized acrylic resin, the valve seat being formed in the metal valve body with a concave truncated conical contour.

References Cited in the file of this patent

UNITED STATES PATENTS

| | | |
|---|---|---|
| 2,450,694 | Sauer | Oct. 5, 1948 |
| 2,477,127 | Holtz | July 26, 1949 |
| 2,497,354 | Hackathorn | Feb. 14, 1950 |
| 2,646,246 | Tucci | July 21, 1953 |

FOREIGN PATENTS

| | | |
|---|---|---|
| 210,530 | Great Britain | of 1924 |
| 320,744 | Great Britain | of 1929 |
| 374,553 | Italy | of 1939 |